United States Patent
Fleischmann et al.

(10) Patent No.: US 10,208,455 B2
(45) Date of Patent: Feb. 19, 2019

(54) IN-VEHICLE DYNOMETER

(71) Applicant: DEERE & COMPANY, Moline, IL (US)

(72) Inventors: Steve G. Fleischmann, Dubuque, IA (US); Kristen D. Cadman, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 168 days.

(21) Appl. No.: 15/072,593

(22) Filed: Mar. 17, 2016

(65) Prior Publication Data

US 2017/0268203 A1 Sep. 21, 2017

(51) Int. Cl.
| | | |
|---|---|---|
| *E02F 9/20* | (2006.01) | |
| *B60W 10/10* | (2012.01) | |
| *B60W 10/184* | (2012.01) | |
| *B60W 50/00* | (2006.01) | |
| *E02F 9/22* | (2006.01) | |

(Continued)

(52) U.S. Cl.
CPC .......... *E02F 9/2066* (2013.01); *B60W 10/10* (2013.01); *B60W 10/184* (2013.01); *B60W 50/00* (2013.01); *E02F 9/2225* (2013.01); *E02F 9/2232* (2013.01); *E02F 9/2246* (2013.01); *E02F 9/26* (2013.01); *F15B 11/08* (2013.01); *G01L 3/10* (2013.01); *B60W 2050/0026* (2013.01); *E02F 3/964* (2013.01); *F15B 2211/20523* (2013.01); *F15B 2211/20546* (2013.01); *F15B 2211/6309* (2013.01); *F15B 2211/6651* (2013.01); *F15B 2211/855* (2013.01)

(58) Field of Classification Search
CPC ..... E02F 9/2066; E02F 9/2225; E02F 9/2232; E02F 9/26; E02F 3/964; B60W 10/10; B60W 10/184; B60W 50/00; B60W 2050/0026; F15B 11/08; F15B 2211/20546; G01L 3/10
See application file for complete search history.

(56) References Cited

U.S. PATENT DOCUMENTS

| | | |
|---|---|---|
| 3,942,363 A | 3/1976 | Swis et al. |
| 4,807,467 A | 2/1989 | Kugler |

(Continued)

FOREIGN PATENT DOCUMENTS

KR  20070077867 A  7/2001

*Primary Examiner* — Jerrah Edwards
*Assistant Examiner* — Mathew Franklin Gordon
(74) *Attorney, Agent, or Firm* — Taft Stettinius & Hollister LLP; Stephen F. Rost

(57) ABSTRACT

A hydraulic system is adapted to provide at least one of a fluid flow at a variable fluid pressure or a fluid flow at a variable fluid displacement. A pressure sensor measures a fluid pressure. A controller is in communication with the engine and the pressure sensor. Wherein, the controller sends an engine speed signal to operate the engine in an open state and controls the fluid displacement or the fluid pressure of the hydraulic system to a first load condition. Further wherein, the controller detects an engine speed and a fluid pressure of the hydraulic system with the pressure sensor when the engine is in the open state and the hydraulic system is in the first load condition. Further wherein, the controller operably calculates a total engine torque as a function of the detected engine speed and fluid pressure when the hydraulic system is in the first load condition.

20 Claims, 5 Drawing Sheets

(51) Int. Cl.
 *E02F 9/26* (2006.01)
 *F15B 11/08* (2006.01)
 *G01L 3/10* (2006.01)
 *E02F 3/96* (2006.01)

(56) References Cited

U.S. PATENT DOCUMENTS

| | | | |
|---|---|---|---|
| 6,006,611 A * | 12/1999 | Galvin | G01L 3/20 |
| | | | 73/862.16 |
| 6,634,984 B1 * | 10/2003 | Doering | F02D 41/083 |
| | | | 477/107 |
| 7,379,801 B2 | 5/2008 | Heffington | |
| 8,505,374 B1 | 8/2013 | Arseneau | |
| 8,989,956 B2 | 3/2015 | Dunst et al. | |
| 9,758,160 B2 * | 9/2017 | Gibson | B60W 20/40 |
| 2006/0272614 A1 * | 12/2006 | Bevan | F02D 31/006 |
| | | | 123/350 |
| 2011/0288722 A1 | 11/2011 | Nicosia et al. | |
| 2014/0039768 A1 * | 2/2014 | Sawada | E02F 9/2235 |
| | | | 701/50 |
| 2016/0208832 A1 * | 7/2016 | Du | F15B 19/005 |
| 2016/0340871 A1 * | 11/2016 | Ohkubo | B60W 10/06 |

* cited by examiner

IN-VEHICLE DYNOMETER

FIELD OF THE DISCLOSURE

The present disclosure relates to an engine dyno system, and in particular, to an engine dyno system that utilizes components of a work machine.

BACKGROUND OF THE DISCLOSURE

Many work machines utilize a mechanical power source, such as an internal combustion engine, to power subsystems mechanically coupled thereto. The subsystems are often mechanical, hydraulic, and electrical systems that convert a torque provided by the power source into a form useable by the respective subsystem. Each of these subsystems rely on the power source to provide enough torque to properly power the respective subsystem. The power source and subsystems are configured so that the power source will provide sufficient torque to power the subsystems as needed under expected load conditions. Typically, the subsystems are designed to work with a nominal expected torque from the power source. As part of the design process, the power source torque is relied upon when considering the types of subsystems that may be utilized by the work machine.

If the work machine does not operate as expected, it is often difficult to determine the root cause of the issue. In this situation, it is common to test the performance of the power source to determine whether it is providing the expected torque during operation. The power source test is typically performed by coupling the power source, or components thereof, to a dynamometer ("dyno"). Some dynos are coupled directly to the power source and require it to be removed from the work machine before engine performance can be analyzed. Other dynos require the dyno to be coupled to a drive system of the work machine. These dynos require either that the work machine be raised so that the drive system does not contact an underlying surface or that the work machine be placed at a location that aligns the drive system with a rotating drum coupled to the dyno.

Accordingly, if the work machine is not operating as expected, it is common to couple the engine or work machine to a dyno in order to determine if the engine is providing sufficient torque to power the systems coupled thereto.

SUMMARY

One embodiment may be a system for checking engine capability comprising a work machine having an engine adapted to provide a torque at an engine speed; a hydraulic system adapted to provide at least one of a fluid flow at a variable fluid pressure or a fluid flow at a variable fluid displacement; a pressure sensor for measuring a fluid pressure of the hydraulic system; and a controller in communication with the engine and the pressure sensor; wherein, the controller sends an engine speed signal to operate the engine in an open state and operably controls at least one of the fluid displacement or the fluid pressure of the hydraulic system to a first load condition; wherein, the controller detects an engine speed and a fluid pressure of the hydraulic system with the pressure sensor when the engine is in the open state and the hydraulic system is in the first load condition; and wherein, the controller operably calculates a total engine torque as a function of the detected engine speed and fluid pressure when the hydraulic system is in the first load condition.

In one example, the controller identifies a fluid displacement of the hydraulic system and calculates a hydraulic system torque load based on the fluid pressure and a fluid displacement. Further, the controller calculates the total engine torque as a sum of a parasitic torque load and the hydraulic system torque load. The parasitic torque load may be generated by at least one of a cooling fan, an alternator, an air conditioning compressor, a transmission charge pump, a transmission torque converter, a hydrostatic pump, an auxiliary hydraulic system, or an air compressor. The controller may determine the parasitic torque load as a function of engine speed.

Another example may comprise a displacement sensor for detecting a fluid displacement of the hydraulic system, where the displacement sensor is in communication with the controller to communicate fluid displacement of the hydraulic system thereto.

In another example, the controller may operably control at least one of the fluid displacement or the fluid pressure of the hydraulic system to a second load configuration; wherein, the controller identifies a second engine speed and a second fluid pressure reading of the hydraulic system when the engine is in the open state and the hydraulic system is in the second load configuration; and wherein, the controller uses the second fluid pressure reading to calculate a second total engine torque when the engine is in the open state and the hydraulic system is in the second load configuration.

Another embodiment may be a method for determining the torque of an engine of a work machine, comprising providing a controller having a processor and a memory unit, an input, at least one parasitic device, and a hydraulic system having a pump and a pressure sensor; storing, in the memory unit of the controller, a parasitic load table that identifies a parasitic torque load based on an engine speed; detecting, with the controller, a signal from the input to initiate a torque measurement procedure stored in the memory unit; executing the torque measurement procedure, with the controller, by sending a signal to the engine to run in an open state; setting, with the controller, the displacement of the hydraulic system between a minimum and a maximum displacement and storing a displacement value in the memory unit; detecting a fluid pressure of the hydraulic system with the pressure sensor and communicating the detected fluid pressure to the controller; operating the engine at an open state and communicating an operating engine speed to the controller; identifying, with the controller, a parasitic torque from the parasitic load table as a function of the operating engine speed; calculating, with the controller, a hydraulic torque based on the set displacement value and the detected fluid pressure; and determining, with the controller, a total engine torque as a function of the parasitic torque and the hydraulic torque.

In one example, the parasitic device may be at least one of a cooling fan, an alternator, an air conditioning compressor, a transmission charge pump, or a transmission torque converter.

In another example, the identifying the parasitic torque step may comprise receiving, by the controller, a plurality of sensor readings when the engine is in the open state, the plurality of sensor readings indicating at least one of an air density, an electrical current, a fluid displacement, an outlet pressure, or a speed ratio; and calculating the parasitic load, with the controller, based on the plurality of sensor readings and the parasitic load table.

In another example, the setting the displacement of the hydraulic system step may comprise adjusting a directional control or pressure control valve, with the controller, to increase a pressure load on the hydraulic system.

In another example the setting the displacement of the hydraulic system step may comprise adjusting a variable displacement pump, with the controller, to set the displacement of the hydraulic system between the minimum and the maximum displacement. Further, the calculating the hydraulic torque step may include identifying, by the controller, both the fluid pressure and the fluid displacement of an outlet of the variable displacement pump.

Another example further comprises providing a torque converter, a transmission, and a braking system in communication with the controller; engaging the braking system, with the controller, during the executing the torque measurement procedure step to restrict movement of the work machine; selecting a drive gear of the transmission, with the controller, to generate a torque converter load on the engine; and including, with the controller, the torque converter load in the determining the total engine torque step.

In another example comprises providing a displacement sensor in the hydraulic system; and identifying the displacement value of a fluid through the hydraulic system, with the controller, using the displacement sensor.

In another example the controller may be used to disengage at least one parasitic device from the engine during the executing the torque measurement procedure step.

Another embodiment may include a method for determining the torque of an engine of a work machine, comprising providing a controller having a processor and a memory unit, an input, at least one parasitic device, a pressure sensor, and a hydraulic system having a pump; storing, in the memory unit of the controller, a parasitic load look-up table with parasitic load values as a function of engine speed and a pump displacement look-up table with pump displacement values as a function of engine speed; detecting a signal from the input to execute a torque measurement procedure; executing the torque measurement procedure, with the controller, to operate the engine at an open state; setting, with the controller, the hydraulic system at a fluid pressure between a minimum and a maximum pressure; measuring a fluid pressure of the hydraulic system with the pressure sensor and communicating the measured fluid pressure to the controller; operating the engine at an open state and communicating an operating engine speed to the controller; identifying, with the controller via the pump displacement look-up table and the parasitic load look-up table, the parasitic torque load and the displacement value based on the operating engine speed; calculating, with the controller, a hydraulic torque based on the displacement value and the measured fluid pressure; and determining, with the controller, a total engine torque as a function of the parasitic torque load and the hydraulic torque.

In one example of this embodiment, the setting step may comprise adjusting a variable directional control or pressure control valve, with the controller, to increase a pressure load on the hydraulic system.

In another example, the setting step may comprise adjusting a variable displacement pump, with the controller, to control the displacement of the hydraulic system between the minimum and the maximum displacement.

In yet another example, the method may further comprise providing a torque converter, a transmission, and a braking system in communication with the controller; engaging the braking system, with the controller, during the executing the torque measurement procedure step to restrict movement of the work machine; selecting a drive gear of the transmission, with the controller, to generate a torque converter load on the engine; and executing the determining step as a function of the torque converter load.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
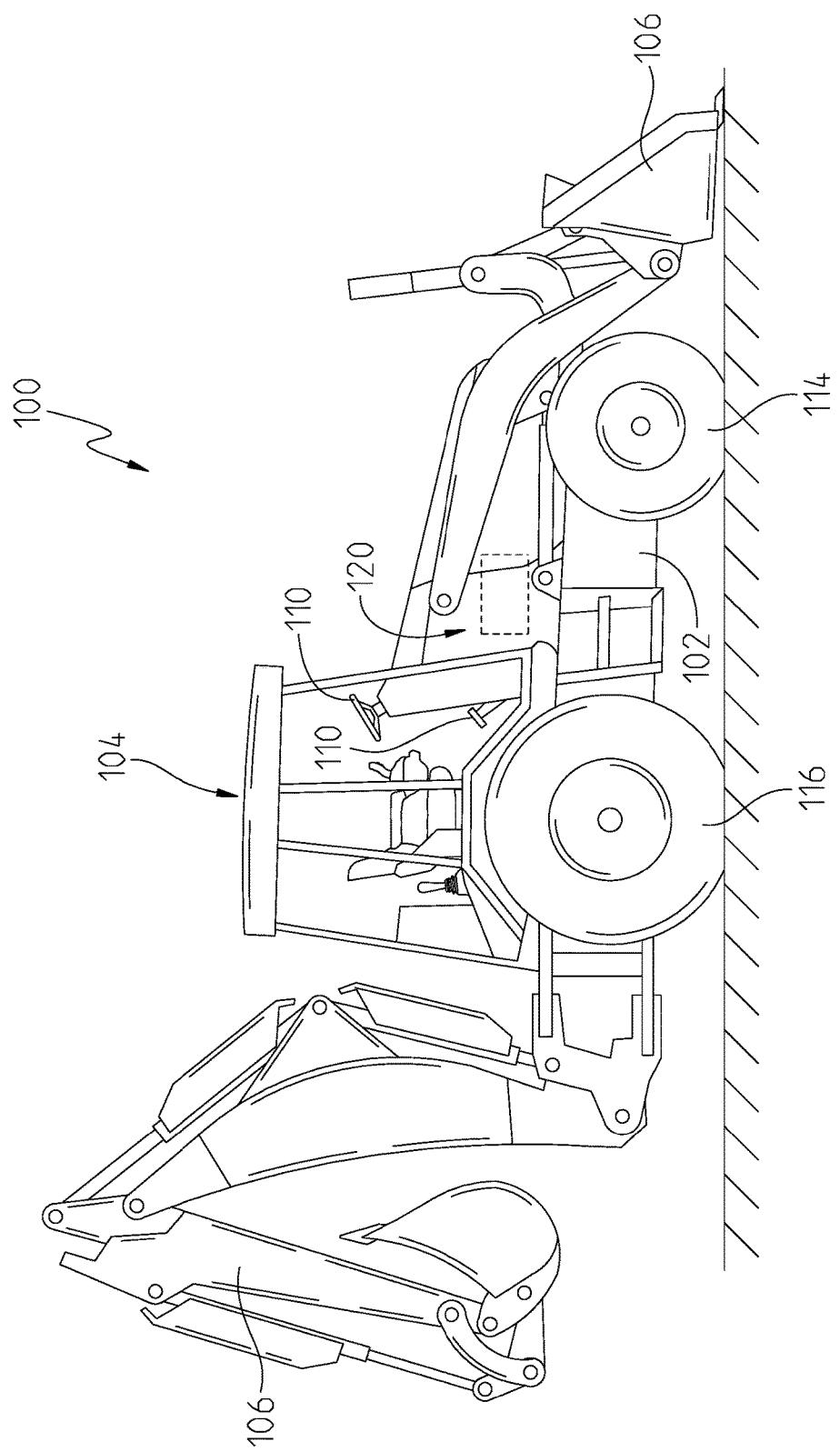
FIG. 1 is a side view of a work machine.

Referring to FIG. 1, a work machine 100 is shown. In one embodiment, the work machine 100 may be a backhoe. However, this disclosure is not limited to such a machine. Rather, the teachings of this disclosure may be applicable to any work machine including, but not limited to, any work machine that utilizes a prime mover 120.

The work machine 100 in FIG. 1 has a mainframe 102 coupled to a front set of wheels 114 and a rear set of wheels 116. Also coupled to the mainframe 102 may be an operator station 104. The operator station 104 may also define an interior region where a user may control the work machine 100 with operator controls 110.

In one aspect of the present disclosure, the operator controls 110 may be manipulated by the user to control the location of one or more implement 106. However, in one embodiment there may be no implement 106 at all. In this embodiment, the operator controls 110 may control the rotation or orientation of the front and rear wheels 114, 116. The operator controls 110 may be switches, levers, push buttons, a steering wheel, pedals, and any other similar control mechanism and this disclosure is not limited to any one. This disclosure is equally applicable to any type of work machine. For example, any agricultural, construction, or forestry machine may utilize the teachings of this disclosure.

Figure 2:
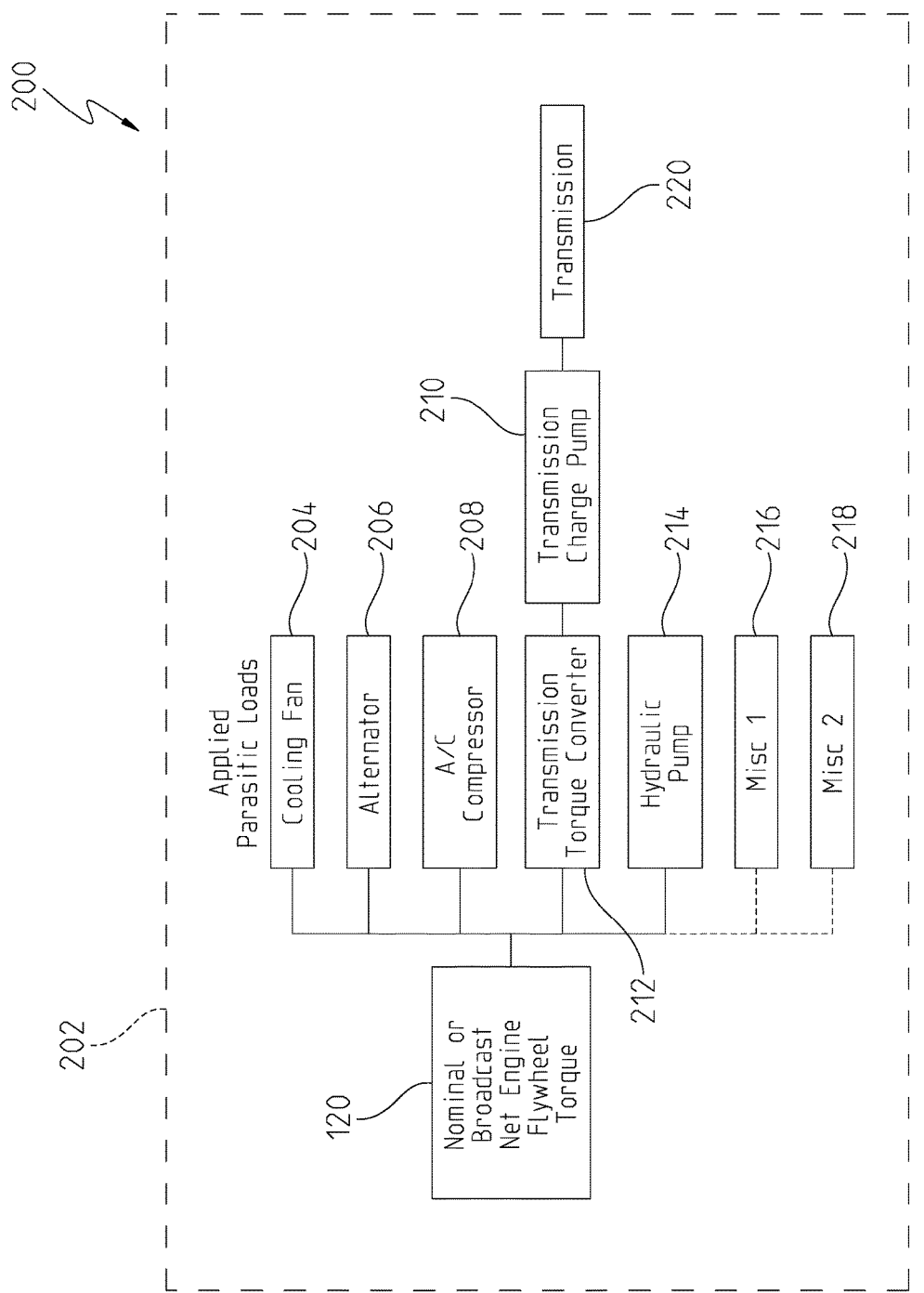
FIG. 2 is an illustrative block diagram of the mechanical systems of the work machine from FIG. 1.

Now referring to FIG. 2, a block diagram 200 illustrates some of the mechanical, electrical, and hydraulic systems utilized by the work machine 100. More specifically, the prime mover 120 may be mechanically coupled to a plurality of mechanical systems 202 to provide torque thereto. The prime mover 120 may be any device known in the art to produce torque. Some non-exclusive examples of a prime mover 120 include an internal combustion engine that utilizes any type of combustible fuel to produce a torque, an electric motor that generates a torque from energy stored in a battery or produced through a generator, a hydraulic or pneumatic motor that generates a torque by utilizing a provided fluid flow and pressure, or any other torque-producing device. Accordingly, this disclosure is not limited to any particular type of prime mover 120.

The prime mover 120 may be mechanically coupled to a cooling fan 204, an alternator 206, and an air conditioning (AC) compressor 208 through a torque transferring means. As one nonexclusive example, the torque transferring means may be a belt or chain (not specifically shown) coupling a shaft of the prime mover to the cooling fan 204, alternator 206, and AC compressor 208. However, this disclosure is not limited to such a torque transferring means and other torque transferring means such as gears and the like are also considered herein. Further still, any one of the cooling fan 204, the alternator 206, or the AC compressor 208 may be directly coupled to the shaft of the prime mover 120.

In another nonexclusive embodiment, a torque converter ("TC") 212 may be mechanically coupled to the prime mover 120 and selectively transfer torque to a transmission 220 through a transmission shaft (not shown). More specifically, the TC 212 may have a TC pump housing that is coupled to the shaft of the prime mover 120 via a flywheel or the like. In this configuration, the TC pump housing is coupled to the shaft of the prime mover 120 so that the TC pump housing will rotate at the same rate as the shaft of the prime mover 120. The TC 212 may also have a turbine (not shown) that is coupled to the transmission input shaft. The turbine may be fluidly coupled to a TC pump to selectively transfer torque produced by the prime mover 120 to the transmission input shaft. A person skilled in the art understands that the TC 212 may have a stall condition where the torque produced by the prime mover 120 and input to the TC pump may be insufficient to cause the transmission input shaft to overcome resistive forces of a vehicle drivetrain. More specifically, in the stall condition, the torque generated by the prime mover 120 and the TC 212 is insufficient to overcome the resistance of the drivetrain. In a stall condition, the TC pump may rotate while the turbine and transmission input shaft do not substantially rotate.

In one embodiment, the TC 212 may generate a resistive torque when the transmission 220 is in a neutral state. In this embodiment, the transmission input shaft may rotate as the prime mover 120 rotates the TC pump, and in turn the turbine. A relatively small resistive torque may be generated by friction and heat losses created therein. In one embodiment, the resistive torque generated by the TC 212 in this configuration can be determined as a function of the engine speed and a constant provided by the manufacturer of the TC 212 or identified through testing the TC 212. More specifically, in the neutral state, the transmission 220 may not transfer the torque produced by the prime mover 120 to the wheels 114, 116 and therefore only a slight resistive torque is generated by the transmission 220.

Alternatively, the TC 212 may produce a TC stall resistive torque when the transmission 220 is in a drive position and the drivetrain is substantially locked. In this configuration, the transmission input shaft may be mechanically coupled to the wheels 114, 116 through the transmission 220 and therefore only rotate if the wheels 114, 116 rotate as well. Accordingly, if a vehicle braking system restricts the wheels 114, 116 from rotating, the transmission input shaft, and in turn the turbine, may also be restricted from rotating because the transmission 220 is in the drive position and the wheels 114, 116 are restricted from moving. Further still, the TC pump may be rotating along with the shaft of the prime mover. In this configuration, the turbine will add a torque resistance because it is not moving relative to the TC pump. In one embodiment, the resistive torque generated by the TC 212 in this configuration can also be determined as a function of engine speed.

The transmission 220 may also have a charge pump 210 that provides hydraulic fluid flow and pressure to the components of the transmission 220. The transmission charge pump 210 may be coupled to the TC 212 along an external portion of the TC pump. In this orientation, when the prime mover 120 rotates the TC pump, the charge pump 210 also rotates to provide hydraulic fluid flow and pressure to hydraulic components within the transmission 220. Accordingly, the mechanical systems of the charge pump 210 also provide a resistive torque that counters the torque produced by the prime mover 120.

The prime mover 120 may also be mechanically coupled to any other mechanical, electrical, or hydraulic system as indicated by 216, 218 (e.g. power take-off unit). A person with skill in the relevant art understands the many different types of systems that can utilize torque produced by the prime mover 120 and this disclosure is not limited to any particular number or type of systems being coupled thereto.

In another embodiment, the work machine 100 also contains a hydraulic pump 214 that is mechanically coupled to the prime mover 120. The hydraulic pump 214 may obtain torque from the prime mover 120 through many different mechanical configurations such as chains and sprockets, gears, belts, or any other mechanism that transfers the torque produced by the prime mover 120 to the hydraulic pump 214.

Another embodiment of the hydraulic pump 214 may indirectly obtain torque produced by the prime mover 120 through the transmission 220. In this embodiment, a power take-off ("PTO") may be part of the transmission 220 and the PTO may provide mechanical access to some, or all, of the torque produced by the prime mover 120. In this embodiment, the hydraulic pump 214 is mechanically coupled to the PTO to provide the torque necessary to power the hydraulic pump 214 when the prime mover 120 is producing torque.

Figure 3:
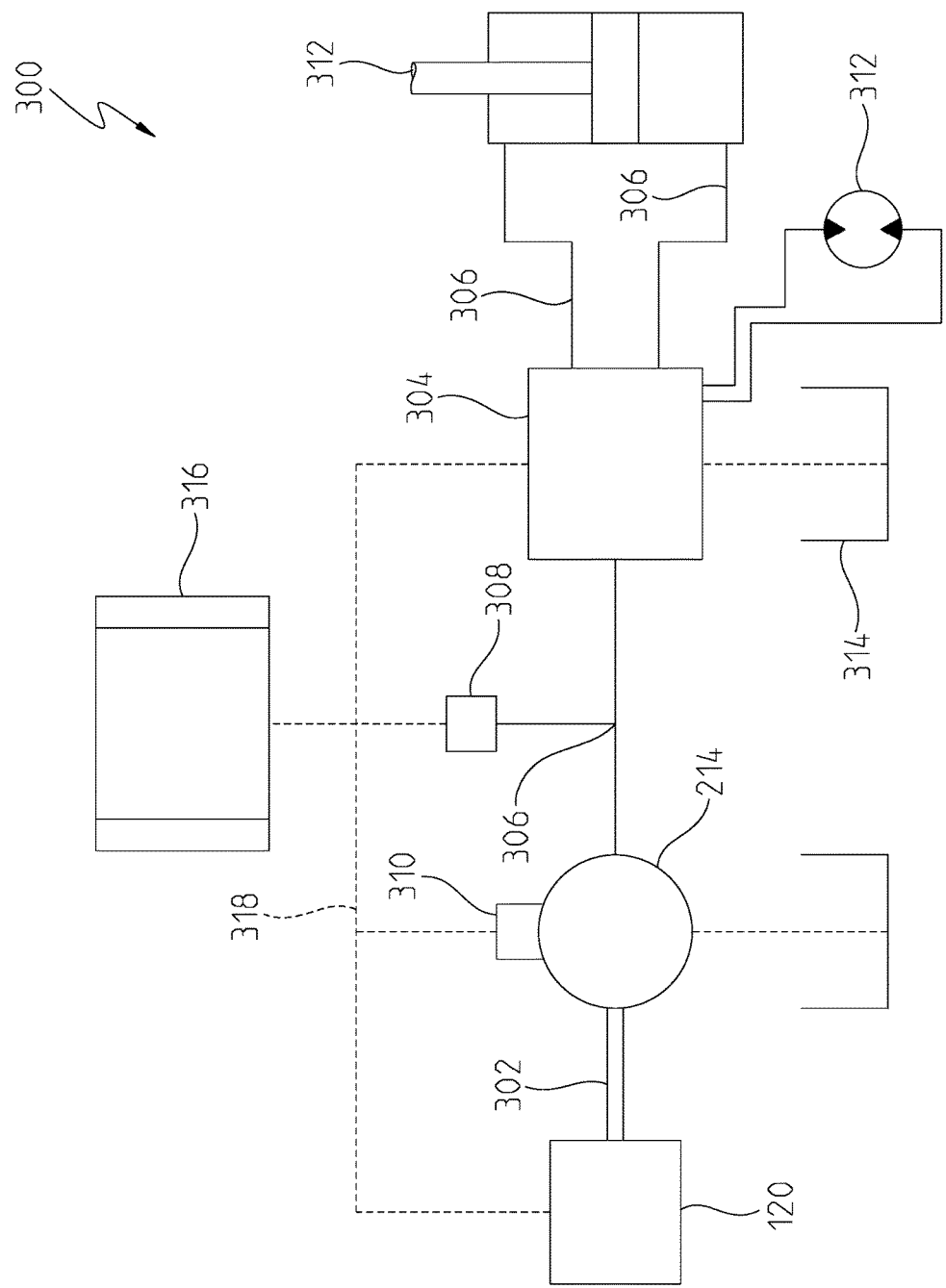
FIG. 3 is an illustrative schematic of one embodiment of a hydraulic system utilized by the work machine of FIG. 1.

The hydraulic pump 214 may be part of a hydraulic system 300 disposed on the work machine 100 as shown in FIG. 3. More specifically, the hydraulic system 300 may utilize mechanical power or torque supplied to the hydraulic pump 214 via the prime mover 120. As described above, the prime mover 120 may be coupled to the hydraulic pump 214 through any type of mechanical connector 302. Further, the hydraulic pump 214 may be fluidly coupled to a valve assembly 304 through one or more fluid paths 306. In addition to fluidly coupling the hydraulic pump 214 to the valve assembly 304, the fluid path 306 may also fluidly couple the hydraulic pump 214 to a pressure sensor 308 and a displacement sensor 310. The valve assembly 304 may also be configured to selectively route the fluid path 306 to one or more actuators 312. In one embodiment, the valve assembly 304 may selectively control the implement 106 by manipulating the fluid path 306 responsive to inputs from the operator controls 110.

The valve assembly 304 may also be configured to vary the pressure or displacement of the fluid within the hydraulic system 300. More specifically, the valve assembly 304 may selectively route the fluid of the hydraulic system 300 to a fluid tank 314 disposed on the work machine 100. Further, the valve assembly 304 may selectively vary the fluid displacement or pressure produced by the hydraulic pump 214 by routing the fluid to the tank 314 under different conditions. In one non-limiting example, the valve assembly 304 may have a valve that is a variable orifice valve, a directional control valve, or a pressure control valve (not shown) that can be adjusted to change the pressure or displacement of the fluid within the hydraulic system 300. In this embodiment, when the prime mover 120 is providing torque to the hydraulic pump 214, the hydraulic pump 214 may produce a maximum fluid pressure and be capable of producing a maximum fluid displacement within the hydraulic system 300. To adjust the fluid displacement or pressure of the hydraulic system 300, the valve assembly 304 may selectively route fluid to the tank 314 through the variable valve.

Similarly, the hydraulic pump 214 may selectively provide fluid at varying fluid pressure or displacement depending on adjustable pump settings. In one embodiment, the hydraulic pump 214 may be a variable displacement pump that can adjust the displacement of fluid therethrough. The variable displacement pump may utilize a swash plate to control the displacement of the hydraulic pump 214 as is known in the art. In this embodiment, the displacement sensor 310 may be a sensor that monitors the position of the swash plate to determine the fluid displacement of the hydraulic pump 214. In another embodiment, the hydraulic pump 214 may be adjustable to alter the output pressure that the hydraulic pump 214 produces.

In one non-limiting aspect of the hydraulic system 300, a controller 316 may be in communication with the components of the hydraulic system 300 through one or more communication paths 318. The one or more communication paths 318 may allow the controller 316 to communicate with the components of the hydraulic system 300 through any form of communication known in the art. For example, one communication path 318 may be wireless. Alternatively, another communication path 318 may include wires of a wire harness. A person with ordinary skill in the art understands the many ways to communicate between a controller and one or more component and this disclosure is not limited to any one form of communication path 318.

Further, the controller 316 may be used by the work machine 100 for other functions. In one non-limiting example, the controller 316 is an engine control module that also controls the prime mover 120 and other components of the work machine 100. In yet another embodiment, the controller 316 is a transmission control module that also controls the components of the transmission. In a further example, the controller 316 may control the prime mover 120 and the transmission 220. A person having skill in the relevant art understands the controller 316 can be integrated into any control system typically disposed on a work machine.

In another embodiment, the controller 316 may communicate with the hydraulic pump 214, the pressure sensor 308, the displacement sensor 310, the prime mover 120, and the valve assembly 304. In this embodiment, the controller 316 may selectively control the pump settings to alter the pressure or displacement of the hydraulic pump 214. Additionally, the controller 316 may also control the valve of the valve assembly 304 to similarly affect the displacement or pressure of the fluid in the hydraulic system 300.

While one embodiment may utilize the controller 316 to adjust both the hydraulic pump 214 and the valve assembly 304, another embodiment may only allow the controller 316 to adjust one of the displacement or the pressure produced by the hydraulic pump 214 or the valve assembly 304. In this embodiment, the controller 316 may only adjust one of the displacement or pressure while the other remains a consistent value. In this configuration, the hydraulic displacement or flow may be altered by only adjusting one of the hydraulic pump 214 or the valve assembly 304 with the controller 316.

The controller 316 may also communicate with the pressure sensor 308 to identify the pressure of the fluid within the hydraulic system 300. Similarly, the controller 316 may also communicate with the displacement sensor 310, or any other kind of flow meter or swash plate sensor, to identify the displacement of the fluid within the hydraulic system 300. As will be described in more detail below, the controller 316 can utilize the pressure sensor 308 and the displacement sensor 310 to calculate a pump resistive torque. More specifically, the pump resistive torque can be determined by any one of the below formulas depending on available data:

$$\text{Pump Resistive Torque} = \frac{(\text{Pressure})(\text{Displacement})}{(\text{Unit Constant})(2\pi)(\text{Mechanical Efficiency})} \quad (a)$$

$$\text{Hydraulic Output Power} = \frac{(\text{Pump Outlet Pressure})(\text{Pump Outlet Flow})}{(\text{Unit Constant})} \quad (b)$$

$$\text{Hydraulic Input Power} = \frac{(\text{Hydraulic Output Power})(\text{Unit Constant})}{(\text{Overall Efficiency})} \quad (c)$$

$$\text{Hydraulic Input Torque} = \frac{(\text{Hydraulic Input Power})(\text{Unit Constant})}{(\text{Input Speed})} \quad (d)$$

wherein the fluid pressure is identified with the pressure sensor 308 and the displacement is identified with the displacement sensor 310.

Equation (a) shown above may be particularly useful for applications that include a variable displacement pump which allows the displacement to be adjusted. Further, equation (a) may be used with pumps that are at a full displacement and the displacement is known. In yet another embodiment, equation (a) may be used for a pump with a known fixed displacement. In another non-exclusive embodiment, equation (a) may utilize a pump mechanical efficiency map variable in addition to the pressure and displacement values for the torque calculation.

However, equations (b)-(d) may be necessary when the particular displacement of the hydraulic pump 214 is not known or not practical to physically measure or determine. In that case, the hydraulic output power can be determined in equation (b) by multiplying the measured pressure and displacement at the hydraulic pump 214 outlet and dividing the sum by a unit of measure constant. Then, using equation (c), the hydraulic input power can be calculated by dividing the hydraulic power determined in equation (b) by the overall efficiency. Finally, in equation (d), the hydraulic input torque may be determined by dividing the hydraulic input power calculated in (c) by the input speed of the hydraulic pump 214.

While several specific equations are shown and described above for determining the resistive torque of the hydraulic pump 214, this disclosure is not limited to any particular method. Many different resistive torque or power calculations are considered herein, albeit not particularly described. A person having skill in the relevant art understands the many ways torque or power values of a pump may be calculated and this disclosure is not limited to any particular way of determining a pump resistive torque value.

Further, the pump efficiency may be a known value programmed into the controller 316. The pump efficiency value may be a known characteristic for a specific pump design. More specifically, the pump efficiency may be determined for the specific hydraulic pump 214 used in the hydraulic system 300. Either one of the fluid pressure or the displacement may be known values instead of measured values. In one non-exclusive example, any one of the fluid pressure, fluid displacement, and/pump efficiency may be predefined for the specific hydraulic pump 214 implemented in the work machine 100. Performance data may be generated for the hydraulic pump 214 identifying the expected fluid pressure, fluid displacement, or pump efficiency based on test data previously generated for the specific hydraulic pump 214.

Alternatively, in another example, any one of the fluid pressure, fluid displacement, or pump efficiency may be predefined in the controller 316 based on average pump performance data. The average pump performance data may have been generated based on average values identified from similar production pumps. That is to say, expected fluid pressure, fluid displacement, or pump efficiency data may be based on average or estimated values previously identified for similar pumps and not be based on actual test data for the specific pump used in the work machine 100.

In one non-exclusive example, the displacement of the hydraulic pump 214 may be a known value and only the fluid pressure may vary. In this example, the controller 316 may only measure the fluid pressure to determine pump resistive torque because the displacement is known and constant. Alternatively, fluid pressure may be held constant and the controller 316 may only need to measure the fluid displacement to determine the pump resistive torque.

The pump resistive torque may be increased or decreased by the controller 316 by altering the fluid pressure or displacement as discussed above. More specifically, the controller 316 may increase the pump resistive torque by increasing the fluid pressure or displacement of the hydraulic pump 214, the valve assembly 304, or both, as described above.

Figure 4:
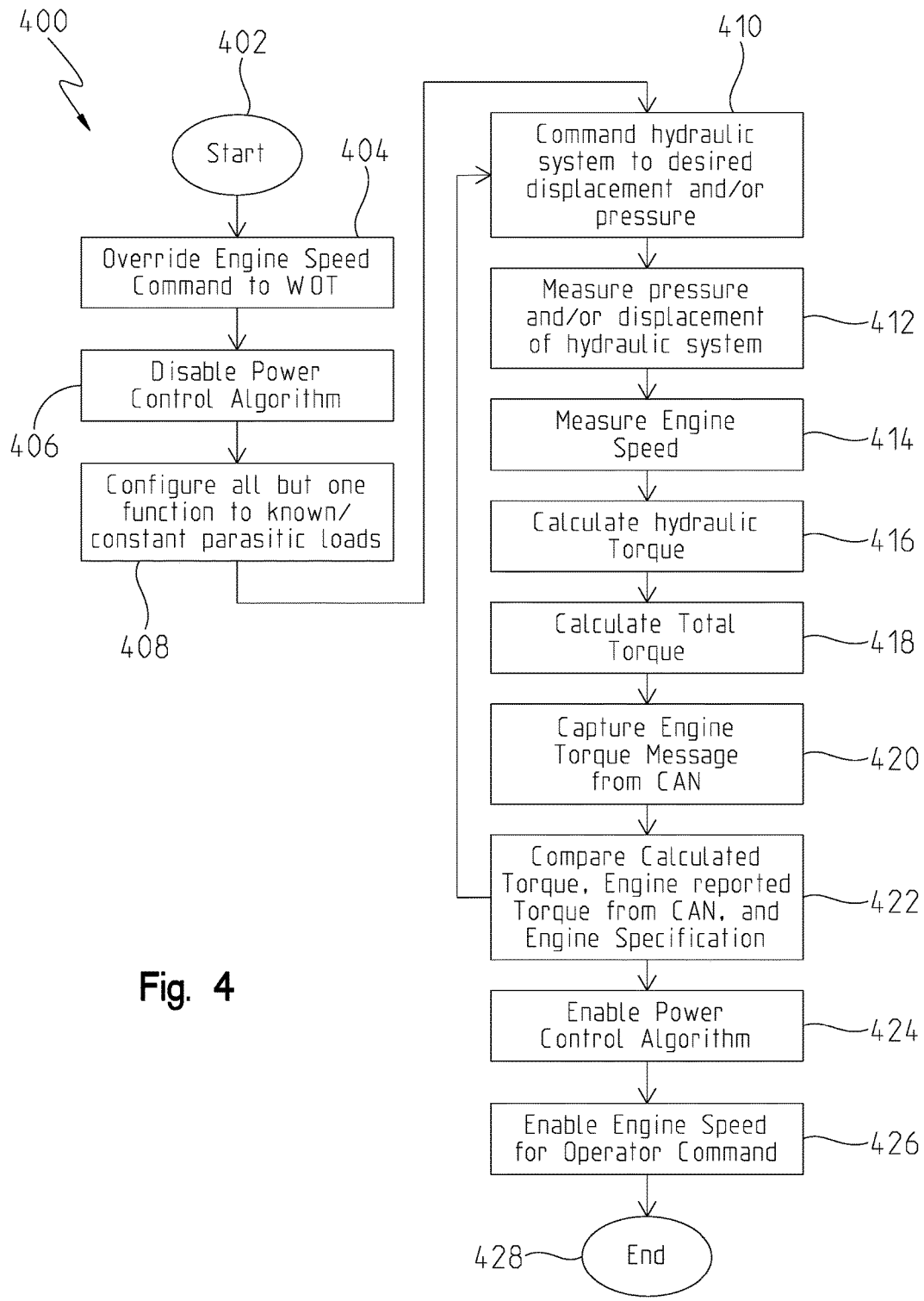
FIG. 4 is an illustrative embodiment of a logic flow chart for a control system.

Referring to FIG. 4, a control system 400 is shown for determining a total torque produced by the prime mover 120. In block 402, a start sequence may be initiated through an input sent to the controller 316 from the operator controls 110 indicating that a total torque procedure should be initiated. The input sent to the controller 316 is not limited to coming from the operator controls 110, however. In one embodiment, the input may be sent remotely to the controller from a wireless source. In another embodiment, the input may be sent to the controller from a diagnostic device such as a handheld computer.

Next, in block 404, the controller 316 may override standard control parameters for the prime mover 120. In one non-exclusive example, the override command from block 404 may restrict the prime mover 120 from responding to a speed command that is requested by the user, in part, via the operator controls 110. In block 404, the controller 316 may also send a signal to the prime mover 120 to operate at an open or overridden state. In one non-exclusive example, the open state may be the state in which the prime mover 120 is operating as if a throttle controlling the prime mover speed was fully open or in a wide open throttle ("WOT") condition. Further, the controller 316 may alter the throttle to any position between a closed state and the open state. In one non-exclusive example, the controller 316 may open the throttle to a position that is similar to a governed throttle position. The governed throttle position can be a position that allows the prime mover 120 to function within a predefined governed limit that is utilized during regular operation of the work machine 100. However, this disclosure is not limited to any particular throttle position and the controller may send a signal to the prime mover 120 to operate in any state to simulate any throttle position in block 404.

In block 406, the controller 316 may disable a power control algorithm. The power control algorithm may typically control the amount of maximum input torque or power consumed by the hydraulic system 300 under the various operating conditions. However, when the power control algorithm is disabled, the controller 316 may control the maximum input torque or power consumed by the hydraulic system 300 under the various operating conditions.

In block 408, the controller 316 removes any unnecessary systems that may restrict the torque produced by the prime mover 120. More specifically, in one embodiment the controller 316 may uncouple the AC compressor 208 from the prime mover 120. In another embodiment the transmission 220 may be shifted into neutral to limit the resistive torque of the TC 212. Further still, any of the systems that create a restrictive torque on the prime mover 120 during operation may be uncoupled therefrom in block 408. In one non-exclusive example, one or more clutch assemblies (not particularly shown) may be utilized to substantially disengage any one of, or all of, the mechanical systems 202 at block 408.

In another non-exclusive embodiment, the controller 316 may remove or restrict as many extraneous variables as possible in block 408. In this embodiment, the controller 316 may limit the components causing restrictive torque to the components that generate the most known and consistent restrictive torque loads. The specific components being limited by the controller 316 may differ and this disclosure is not limited to any particular set of components being removed or restricted by the controller. Rather, any number of components may be removed or restricted by the controller 316 to provide a more accurate control system 400 as described above.

In one nonexclusive example, block 408 may disable substantially all of the mechanical systems 202 except for the hydraulic pump 214. In this configuration, the resistive torque acting against the prime mover 120 may be substantially the pump restrictive torque described above. In this embodiment, block 410 may alter the hydraulic pump 214 or the valve assembly 304 to alter the displacement of the fluid in the hydraulic system 300 to a desired value.

In the next block 412, the controller 316 may communicate with the pressure sensor 308 or the displacement sensor 310 to identify the pump outlet pressure or displacement after the hydraulic pump 214 or valve assembly 304 has altered the displacement or pressure of the fluid in the hydraulic system 300 in block 410. In block 414, the controller 316 may measure the speed in which the prime mover 120 is rotating after the hydraulic pump 214 or valve assembly 304 have altered the displacement or pressure of the fluid in the hydraulic system 300 in block 410.

Then, in block 416, the controller 316 may calculate the pump restrictive torque when the engine is commanded to WOT or the open state and the displacement is altered by the hydraulic pump 214 or valve assembly 304 as commanded in block 410. The pump restrictive torque may be calculated using the equations identified above; however, any mathematical equation that identifies a restrictive torque utilizing pressure and displacement values is also considered herein.

Once the controller 316 has identified the pump restrictive torque, the controller 316 may proceed to calculate any remaining, or parasitic, loads on the prime mover 120 as indicated by block 418. The parasitic loads may include any known load that may be resisting the torque produced by the prime mover 120. More specifically, if any of the remaining mechanical systems 202 are still coupled to the prime mover 120, the controller 316 may consider the parasitic load generated by each when calculating the total torque in block 418. In one non-exclusive example, the parasitic load may be generated by a cooling fan, an alternator, an air conditioning compressor, a transmission charge pump, a transmission torque converter, a hydrostatic pump, an auxiliary hydraulic system, an air compressor, or any other known system or component that may generated a resistive torque on a prime mover.

In one non-exclusive example of block 418, the controller 316 may include a parasitic load added by the cooling fan 204. The controller 316 may calculate the parasitic load generated by the cooling fan 204 by identifying the fan speed, air temperature or air density and multiplying the two by a constant value stored in the controller 316. Alternatively, the parasitic load generated by the cooling fan 204 may be programmed into the controller 316 as a look-up table identifying constant values produced by the cooling fan 204.

In another non-exclusive example, the alternator 206 may produce a parasitic load on the prime mover 120 that is determined by the controller 316 by referencing a look-up table that is pre-programmed into the controller. The look-up table may identify the parasitic load generated by the alternator based on the rotation speed of the prime mover 120, the current output of the alternator, or the alternator temperature. The AC compressor 208, transmission charge pump 210, TC 212, and any other system coupled thereto 216, 218 may also utilize a similar strategy to determine additional parasitic load generated thereby. In one embodiment, parasitic load look-up tables may be pre-programmed into the controller 316 based on test data developed for the specific device adding the parasitic load. In yet another embodiment, the parasitic load look-up tables may not rely on data generated from the actual device adding the parasitic load, but rather the parasitic load look-up tables may be pre-programmed into the controller 316 based on data generated by averaging performance of other similar devices.

While the method of utilizing a lookup table with the controller 316 to determine the parasitic loads has been described above, this disclosure also considers calculating or measuring parasitic loads as part of block 418. More specifically, the controller 316 may use known constants along with measured values such as rotation speed, displacement, pressure, or the like to calculate the parasitic loads of any of the mechanical systems 202 coupled thereto. Accordingly, this disclosure is not limited to any particular method of determining the parasitic loads.

Block 418 may also sum the parasitic loads with the pump resistive torque to identify the total torque produced by the prime mover 120. The total torque identified in block 418 may be the total torque calculated by the controller 316 when the hydraulic system 300 has been adjusted to have to fluid displacement and pressure of block 410.

The controller 316 may also be in communication with other control systems utilized by the work machine 100. In block 420, the controller 316 may communicate with an engine control module (not specifically shown) to identify an engine torque message generated by the engine control module. The engine torque message may be communicated to the controller 316 as an expected total torque determined by the engine control module based on pre-programmed engine data and the measured engine speed from block 414. Alternatively, the engine torque message may be generated by the engine control module by monitoring a plurality of sensors throughout the prime mover 120.

In block 422, the engine torque message from block 420 may be compared to the total torque calculated in block 418 and with an engine specification torque. The engine specification torque may be determined from an engine torque look-up table generated by the manufacturer of the engine or other prime mover 120 and stored in the controller 316. The engine torque look-up table may identify the expected engine specification torque based on the engine speed. In this embodiment, the controller may utilize the engine speed determined at block 414 to determine the expected engine specification torque via the engine torque look-up table. In short, block 422 may generate three different torque values for the engine based on the measured engine speed in block 412, the calculated total torque from block 418, the expected total torque determined by the engine control module, and the engine specification torque determined by the engine torque look-up table.

In one aspect of the control system 400, blocks 410-422 may be repeated under different load conditions to generate a torque curve where the prime mover 120 torque is plotted against prime mover rotational speed. In one non-limiting example, in a first cycle, block 410 may alter the hydraulic pump 214 or the valve assembly 304 so the displacement or pressure of the fluid in the hydraulic system 300 will generate a low pump resistive torque. The controller 316 may then execute blocks 412-422 based on the conditions of the hydraulic system 300 set in block 410 and store the calculated total torque, the expected total torque, and the engine specification torque for the first cycle. The controller 316 may then execute a second cycle where execution of block 410 adjusts the hydraulic pump 214 or the valve assembly 304 so the displacement or pressure of the fluid in the hydraulic system 300 will generate a higher pump resistive torque than generated in the first cycle. The controller 316 may then execute blocks 412-422 based on the conditions of the hydraulic system 300 set in block 410 and store the calculated total torque, the expected total torque, and the engine specification torque for the second cycle.

A person having skill in the art understands that any number of cycles or iterations of blocks 410-422 may be executed by the controller 316 utilizing the hydraulic pump 214 or the valve assembly 304 to alter the displacement or pressure of the fluid in the hydraulic system 300 to alter the pump resistive torque. Further, when an adequate number of cycles or iterations of blocks 410-422 have been completed, the controller 316 may execute block 424 to enable the power control algorithm previously disabled in block 406. Then, in block 426, the controller 316 may return the prime mover 120 to the standard control parameters that were overridden in block 404. In block 426, the controller 316 may enable the speed command that is generated, in part, by the operator controls 110, to partially determine the prime mover 120 operating conditions. Finally, in block 428, the control system 400 may end.

In another embodiment, the controller 316 may alter the hydraulic system 300 between a minimum hydraulic load condition and a maximum hydraulic load condition in different cycles or iterations of blocks 410-422. In the minimum hydraulic load condition, the hydraulic system 300 may be oriented so the hydraulic pressure and displacement therein generate a low pump resistive torque. In the minimum hydraulic load condition, the prime mover may have a maximum engine speed as determined in block 414 (see maximum value 506 from FIG. 5). Alternatively, the maximum hydraulic load condition may use the hydraulic system 300 to vary the displacement and pressure therein to generate a maximum pump resistive torque. The maximum pump resistive torque may result in a minimum engine speed determined in block 414 because of the maximum pump resistive torque (see minimum value 508 from FIG. 5). More specifically, because the engine speed command is held constant in block 404, varying the pump resistive torque load on the prime mover 120 results in a varied measured engine speed in block 414.

Figure 5:
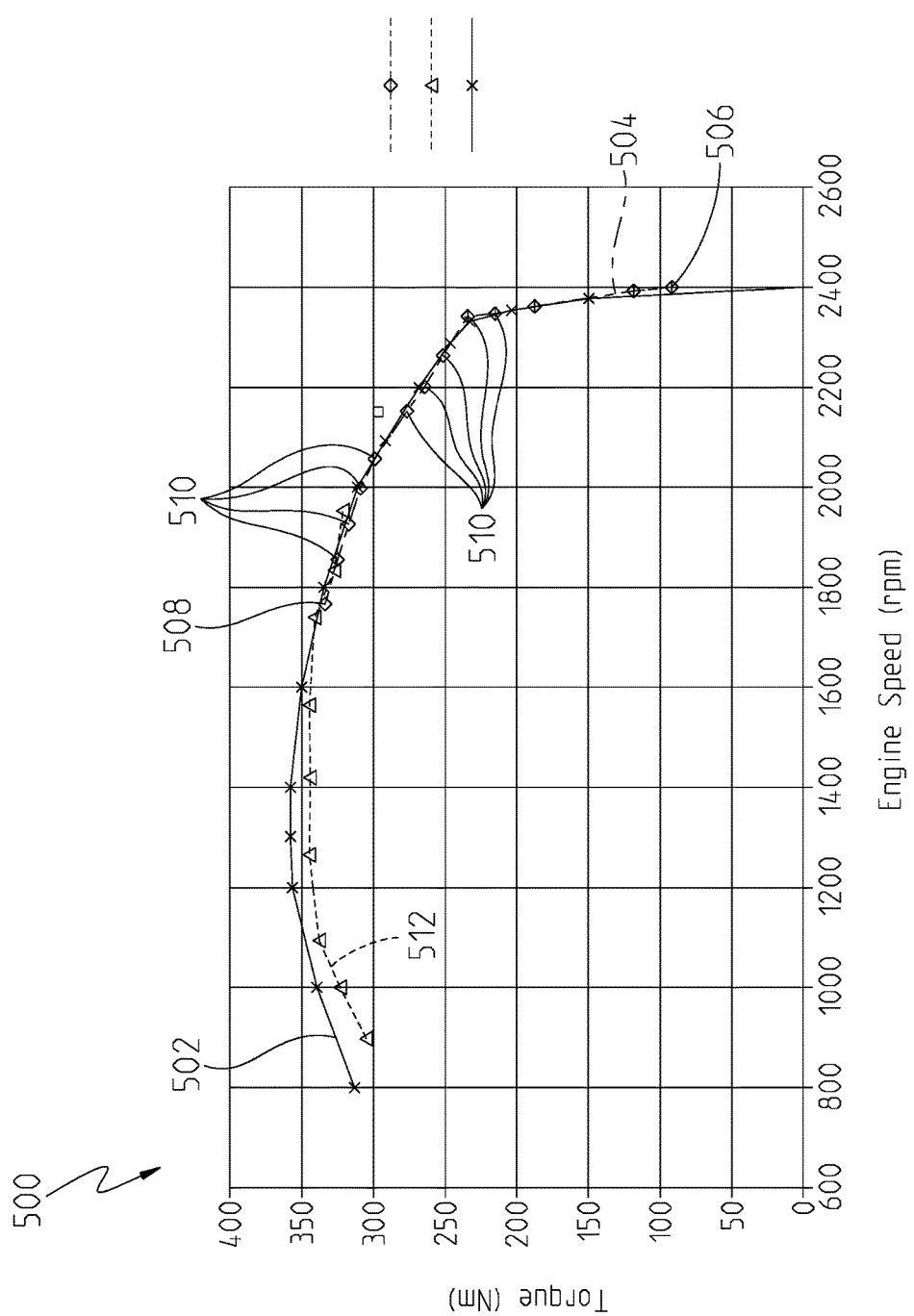
FIG. 5 is a graph illustrating torque as a function of an engine speed.

Referring now to FIG. 5 a torque graph 500 is shown where a torque is displayed as a function of engine speed. More specifically, a first curve 502 may be an example of a torque curve provided by the manufacturer of the prime mover 120. The first curve 502 can be preset data points identifying how the manufacturer suggests the prime mover 120 will perform under corresponding load conditions.

A second curve 504 is also shown in FIG. 5. The second curve 504 may represent values calculated by the controller when executing blocks 410-422 of FIG. 4. As described above, the maximum value 506 of the second curve 504 may be a condition where the hydraulic system 300 has only a minimum pump resistive torque. Alternatively, the minimum value 508 may be a condition where the hydraulic system has a maximum pump resistive torque as described above.

Further, a plurality of data points 510 may be calculated between the minimum value 508 and the maximum value 506. The fluid pressure or displacement generated by the hydraulic system 300 may be adjusted or varied in block 410 and any number of cycles or iterations of blocks 410-422 may be executed by the controller 316 to generate any number of data points 510. Accordingly, the plurality of data points 510 are a graphical representation of different load conditions established while executing block 410 and calculated by the controller in block 418.

While the second curve 504 indicates specific data points showing values generated in blocks 410-422, this disclosure is not limited to stepped or otherwise segmented data points. More specifically, blocks 410-422 can be executed at substantially the same time. Further still, in block 410, the controller 316 may adjust the hydraulic system 300 between the minimum pump resistive torque load and the maximum pump resistive torque load while continuously executing blocks 412-422. In this embodiment, the second curve 504 may be generated by an unlimited number of data points.

In the non-limiting embodiment of the torque graph 500 shown in FIG. 5, the maximum pump resistive load, illustrated at the minimum value 508, may be insufficient to bring the prime mover 120 to a stall condition. A stall condition may occur when the total resistive torque load is sufficient to cause the prime mover 120 to stop rotating. When the hydraulic system 300 is the only substantial resistive torque load acting against the prime mover 120, the pump resistive torque may be insufficient to induce a stall condition. In this embodiment, one or more of the additional mechanical systems 202 may need to be engaged to generate enough resistive torque to induce a stall condition.

One non-exclusive way to increase the resistive torque generated by the work machine 100 is to engage the transmission 220 in a drive state and restrict the wheels 114, 116 from rotating as described in detail above. In this embodiment, the resistive torque added by the TC 212 allows for the controller 316 to generate a third curve 512. More specifically, by executing blocks 410-422 when the TC 212 is in this configuration, the resistive loads on the prime mover 120 may be sufficient to create a stall condition. In one nonexclusive example, the load added by the TC 212 shifts the third curve 512 towards the lower engine speeds on the torque graph 500 relative to the second curve 504.

While modifying the TC 212 was described above to add resistive torque loads to generate the third curve 512, this disclosure is not limited to using the TC 212. Other embodiments may utilize manipulating any of the mechanical systems 202 to increase load. In one non-exclusive example, the AC compressor 208 may be transitioned to an engaged mode to increase resistive torque load. Further still, the operating conditions of the cooling fan 204, alternator 206, transmission charge pump 210, or any of the other mechanical, electrical, or hydraulic systems 216, 218 may be altered to increase parasitic resistive torque loads and thereby shift the respective torque curve to different engine speed ranges.

In another embodiment, the control system 400 may execute blocks 410-422 with the transmission 220 in the neutral state to generate the second curve 504. Then, the controller 316 can engage the braking system of the prime mover 120 and send a signal to engage the transmission 220 in the drive state. The controller 316 may subsequently execute blocks 410-422 with the increased resistive torque load produce by the TC 212 to generate the third curve 512. Finally, the controller 316 may combine the second curve 504 with the third curve 512 to identify a calculated torque curve for the entire operating range for the prime mover 120.

In another aspect of this disclosure, the controller 316 may record the information generated by each executed cycle or iteration of blocks 410-422 in a memory unit. In this embodiment, the controller may record the measured engine speed from block 414, the calculated hydraulic torque from block 416, the calculated total torque from block 418, and the engine torque signal from block 420, etc. The controller 316 may record at least these values for each cycle or iteration of blocks 410-422. More specifically, the controller 316 can record these values for each variation of pump resistive torque load produced during block 410.

In addition to recording any of the information determined by the controller 316 in each cycle or iteration of blocks 410-422, the controller 316 may also send an output signal containing all of the recorded information. In one non-limiting example, the work machine 100 may have a screen (not shown). The controller 316 may send the output signal to the screen to show a graphical representation of the recorded values determined during blocks 410-422. In one embodiment, the graphical representation may be a torque graph similar to the torque graph 500 shown in FIG. 5. The recorded values may be shown on a graph with a y-axis indicating torque value and an x-axis indicating an engine speed value. In this embodiment, each cycle or iteration of blocks 410-422 may use the engine speed determined in block 414 and the calculated total torque in block 418 to generate a calculated torque curve that can be shown on the screen.

In another embodiment, the output signal may be sent to a computing device either through a wired or wireless connection. In this embodiment, a third party may receive the data generated during blocks 410-422. Further, the calculated torque curve generated during blocks 410-422 can be analyzed via the computing device at a location remote from the work machine 100.

In yet another embodiment, the computing device can wirelessly and remotely initiate the control system 400 to execute blocks 402-428. In this embodiment, a third party may wirelessly access the control system 400 utilizing any of a plurality of known wireless communication protocols.

The third party may initiate execution of blocks 402-428 to generate a torque curve that indicates the calculated torque of the prime mover 120.

The control system 400 may have a test protocol stored in the memory unit of the controller 316. In this embodiment, the user or third party may initiate a test sequence that automatically executes blocks 404-406 as described above. At this point, the test sequence may have a predefined number of cycles or iterations of blocks 410-422. In the first cycle of 410-422, the controller 316 may set the pressure or displacement of the hydraulic system 300 to a minimal pump resistive torque condition. In the second cycle, the controller 316 may adjust the pressure or displacement of the hydraulic system 300 to have a slightly increased pump resistive torque. The controller 316 may execute any number of subsequent cycles, slightly increasing the pump resistive torque until the maximum pump resistive torque is reached. At this point, the controller 316 may send a signal to the braking system to engage the brakes of the work machine 100. The controller 316 may then send a signal to the transmission 220 to enter the drive state to increase the resistive torque produced by the TC 212. Next, the controller 316 can execute blocks 410-422 again varying the pump resistive torque between the minimum and maximum pump resistive load as described above. The test sequence may conclude by combining the data generated both when the transmission is in the drive state and when the transmission is in the neutral state and sending all data generated during the test sequence to the screen of the work machine 100 or the remote computing device.

While the control system 400 and blocks 402-428 have been described and shown sequentially, this disclosure is not limited to the particular sequence shown. Many of the blocks 402-428 can be executed by the controller 316 in a different sequence. Further still, in one embodiment, many of the blocks 402-428 may be executed by the controller 316 at substantially the same time. A person having skill in the relevant art understands that the controller 316 may execute the blocks 402-428 in many difference sequences and at different times without straying from the teachings of this disclosure. Accordingly, this disclosure is not limited to the sequence of the control system 400 shown in FIG. 4.

While the term torque is used throughout, power could also be used instead. A person having skill in the relevant art understands that this disclosure is equally applicable to determining the power of the work machine 100. More specifically, power can be determined utilizing the torque values and engine speeds described herein. Accordingly, while torque values have been described throughout, power values (such as horsepower) could also be used and this disclosure is not limited to the exclusive use of either one.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A system for checking engine capability comprising:
a work machine having an engine adapted to provide a torque at an engine speed, including a control system disposed on the work machine;
a hydraulic system adapted to provide at least one of a fluid flow at a variable fluid pressure or a fluid flow at a variable fluid displacement;
a pressure sensor for measuring a fluid pressure of the hydraulic system;
a parasitic device providing a parasitic torque load; and
a controller in communication with the engine, the parasitic device, and the pressure sensor, wherein the controller is integrated into the control system;
wherein, the controller sends an engine speed signal to operate the engine in a wide open throttle condition and operably controls the parasitic device and at least one of the fluid displacement or the fluid pressure of the hydraulic system to a first load condition, wherein the engine speed signal in the wide open throttle condition overrides a user speed command requested by a user;
wherein, the controller detects an engine speed, the parasitic torque load, and a fluid pressure of the hydraulic system with the pressure sensor when the engine is in the wide open throttle condition and the hydraulic system is in the first load condition; and
wherein, the controller operably calculates a total engine torque as a function of the detected engine speed at the wide open throttle condition, the parasitic torque load, and fluid pressure when the hydraulic system is in the first load condition, and enabling the controller to respond to the user speed command once the total engine torque is determined.

2. The system of claim 1, wherein the controller identifies a fluid displacement of the hydraulic system and calculates a hydraulic system torque load based on the fluid pressure and a fluid displacement.

3. The system of claim 2, wherein the controller calculates the total engine torque as a sum of the parasitic torque load and the hydraulic system torque load.

4. The system of claim 3, wherein the parasitic torque load is generated by at least one of a cooling fan, an alternator, an air conditioning compressor, a transmission charge pump, a transmission torque converter, a hydrostatic pump, an auxiliary hydraulic system, or an air compressor.

5. The system of claim 4, wherein the controller determines the parasitic torque load as a function of engine speed.

6. The system of claim 2, further comprising a displacement sensor for detecting a fluid displacement of the hydraulic system, where the displacement sensor is in communication with the controller to communicate fluid displacement of the hydraulic system thereto.

7. The system of claim 1, wherein, the controller operably controls at least one of the fluid displacement or the fluid pressure of the hydraulic system to a second load configuration;
wherein, the controller identifies a second engine speed and a second fluid pressure reading of the hydraulic system when the engine is at the wide open throttle condition and the hydraulic system is in the second load configuration; and
wherein, the controller uses the second fluid pressure reading to calculate a second total engine torque when the engine is at the wide open throttle condition and the hydraulic system is in the second load configuration.

8. A method for determining the torque of an engine of a work machine, comprising:
providing a controller having a processor and a memory unit, an input, at least one parasitic device, and a hydraulic system having a pump and a pressure sensor;

storing, in the memory unit of the controller, a parasitic load table that identifies a parasitic torque load based on an engine speed;

detecting, with the controller, a signal from the input to initiate a torque measurement procedure stored in the memory unit;

executing the torque measurement procedure, with the controller, by sending a signal to the engine to run in a wide open throttle condition;

setting, with the controller, the displacement of the hydraulic system between a minimum and a maximum displacement and storing a displacement value in the memory unit;

detecting a fluid pressure of the hydraulic system with the pressure sensor and communicating the detected fluid pressure to the controller;

operating the engine at the wide open throttle condition and communicating an operating engine speed to the controller;

identifying, with the controller, a parasitic torque from the parasitic load table as a function of the operating engine speed;

calculating, with the controller, a hydraulic torque based on the set displacement value and the detected fluid pressure;

determining, with the controller, a total engine torque as a function of the parasitic torque and the hydraulic torque; and using the controller to disengage the at least one parasitic device from the engine during the executing the torque measurement procedure step.

9. The method of claim 8, wherein the parasitic device is at least one of a cooling fan, an alternator, an air conditioning compressor, a transmission charge pump, or a transmission torque converter.

10. The method of claim 8, further wherein the identifying the parasitic torque step comprises:
receiving, by the controller, a plurality of sensor readings when the engine is in the wide open throttle condition, the plurality of sensor readings indicating at least one of an air density, an electrical current, a fluid displacement, an outlet pressure, or a speed ratio; and
calculating the parasitic load, with the controller, based on the plurality of sensor readings and the parasitic load table.

11. The method of claim 8, wherein the setting the displacement of the hydraulic system step comprises:
adjusting a directional control or pressure control valve, with the controller, to increase a pressure load on the hydraulic system.

12. The method of claim 8, wherein the setting the displacement of the hydraulic system step comprises:
adjusting a variable displacement pump, with the controller, to set the displacement of the hydraulic system between the minimum and the maximum displacement.

13. The method of claim 12, further wherein the calculating the hydraulic torque step includes identifying, by the controller, both the fluid pressure and the fluid displacement of the variable displacement pump.

14. The method of claim 8, further comprising:
providing a torque converter, a transmission, and a braking system in communication with the controller;
engaging the braking system, with the controller, during the executing the torque measurement procedure step to restrict movement of the work machine;

selecting a drive gear of the transmission, with the controller, to generate a torque converter load on the engine; and
including, with the controller, the torque converter load in the determining the total engine torque step.

15. The method of claim 8, further comprising:
providing a displacement sensor in the hydraulic system; and
identifying the displacement value of a fluid through the hydraulic system, with the controller, using the displacement sensor.

16. The system of claim 1, wherein the controller operably calculates the total engine torque as a function of disengaging the parasitic torque load.

17. A method for determining the torque of an engine of a work machine, comprising:
providing a controller integrated into a control system of the work machine, the controller having a processor and a memory unit, an input, at least one parasitic device, a pressure sensor, and a hydraulic system having a pump;
storing, in the memory unit of the controller, a parasitic load look-up table with parasitic load values as a function of engine speed and a pump displacement look-up table with pump displacement values as a function of engine speed;
detecting a signal from the input to execute a torque measurement procedure;
executing the torque measurement procedure, with the controller, by operating the engine at a wide open throttle condition, wherein the engine speed in the wide open throttle condition overrides a user speed command requested by a user;
setting, with the controller, the hydraulic system at a fluid pressure between a minimum and a maximum pressure;
measuring a fluid pressure of the hydraulic system with the pressure sensor and communicating a measured fluid pressure to the controller;
communicating an operating engine speed to the controller;
identifying, with the controller via the pump displacement look-up table and the parasitic load look-up table, the parasitic load values and the displacement value based on the operating engine speed;
calculating, with the controller, a hydraulic torque based on the displacement value and the measured fluid pressure; and
determining, with the controller, a total engine torque as a function of the parasitic load values and the hydraulic torque; and
enabling the controller to respond to the user speed command once the total engine torque is determined.

18. The method of claim 17, wherein the setting step comprises:
adjusting a variable directional control or pressure control valve, with the controller, to increase a pressure load on the hydraulic system.

19. The method of claim 17, wherein the setting step comprises:
adjusting a variable displacement pump, with the controller, to control the displacement of the hydraulic system between the minimum and the maximum displacement.

20. The method of claim 17, further comprising:
providing a torque converter, a transmission, and a braking system in communication with the controller;

engaging the braking system, with the controller, during the executing the torque measurement procedure step to restrict movement of the work machine;
selecting a drive gear of the transmission, with the controller, to generate a torque converter load on the engine; and
executing the determining step as a function of the torque converter load.

* * * * *